Figure 1:
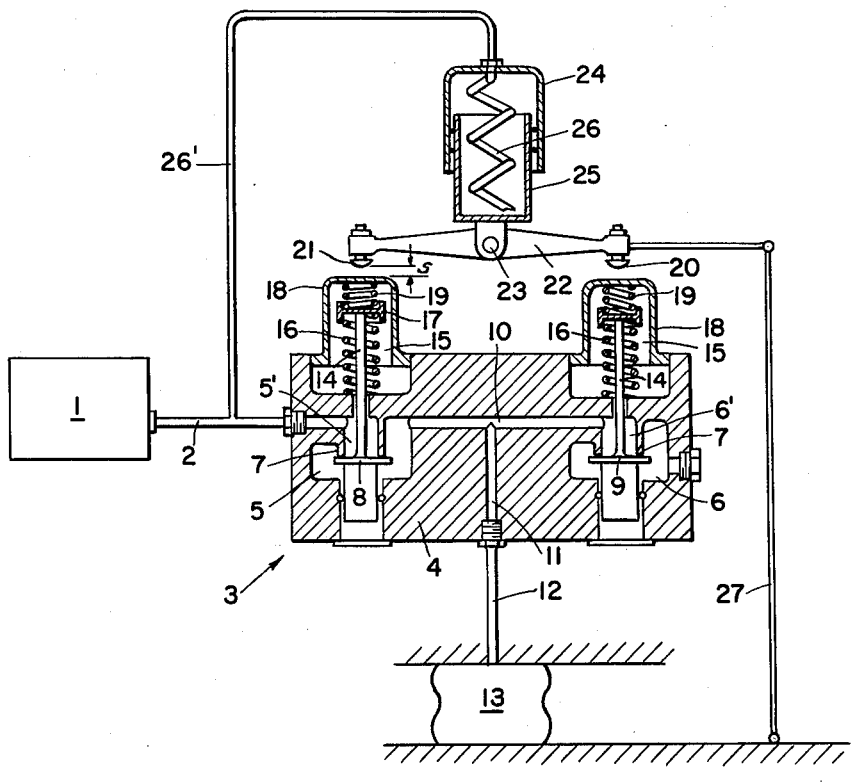

INVENTOR
CARLO MACHNICH

United States Patent Office 2,981,550
Patented Apr. 25, 1961

2,981,550

FLUID SPRING AND LEVELING VALVE ARRANGEMENT FOR VEHICLE SUSPENSION

Carlo Machnich, Gellertpark 8, Basel, Switzerland

Filed Sept. 12, 1958, Ser. No. 760,701

1 Claim. (Cl. 280—124)

The object of the invention is an arrangement for the springing of a vehicle wheel by means of a compressible medium enclosed under pressure in a springing element with a control valve for the regulation of the pressure of the enclosed medium in dependence upon the springing movements of the wheel.

Fundamentally in known arrangements of this type, the regulation of the pressure of the medium takes place either through regulation of quantity or through regulation of volume. In the case of arrangements with quantity regulation, the compressible medium is mostly enclosed in a gas-spring body. In order to increase the pressure, further quantities of the medium are supplied to the gas-spring body, and conversely the release of parts enclosed in the gas-spring body effects the reduction of the pressure obtaining therein. In the case of volume regulation the volume of the spring element available to the spring medium is constricted or extended, in order to achieve the increase, or reduction of the pressure. In most cases this is effected by the supply or removal of a regulating medium, usually a liquid. Although the invention is designed and adapted for both types of springing arrangements, only the arrangements with quantity regulation will be discussed hereinafter and for the sake of simplicity reference is made directly to pneumatic springing arrangements.

As is known, springing arrangements of this type are equipped with load-dependent control valves, which compensate an increase of the wheel loading by the supply of further quantities of air into the gas-spring body, and vice versa. This provides the advantage that the height of the superstructure of the vehicle can be kept constant, independently of the useful load, and that undesired movements of the superstructure, for example, inclination on travel in curves, and as a result of non-uniform distribution of load, are very largely precluded. On the other hand the control valves also respond when a relative movement between the superstructure and the wheel is caused by change of position not of the superstructure but of the wheel. Thus the control valves open the feed conduit of the gas-spring body as soon as the wheel runs up on an uneven portion and springs in and, on the other and, permit air to escape from the gas-spring body when a negative springing movement takes place, for example, when the vehicle travels over holes. This causes a great consumption of air and the necessity of a large store of compressed air, also the control valves and other control elements are subject to increased wear. However, regarded from the point of view of the optimum springing properties, it is not necessary to regulate the quantity of air enclosed in the gas-spring body constantly since the gas-spring body regulated to the static wheel loading can readily deal with small impacts and high frequencies. Furthermore, in the case of high frequencies, the regulation of quantity would lag greatly in time, so that the air consumption then would actually be useless. However, at lower frequencies or in the case of large movements of the wheel a regulation is justified and even necessary. This difference between the necessity or dispensability of the regulation is especially important when the air supply in any case is greatly called upon by other positions of use or has already been reduced.

Figure 2:
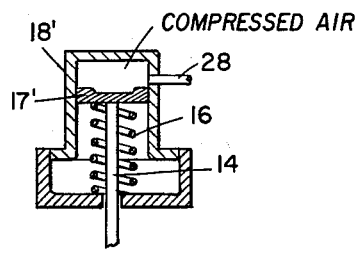

In adaptation to recognition of these facts, the arrangement according to the invention possesses means arranged on the path of transmission of the wheel movements, which determine the sensitivity of the control valve as regards the magnitude and as regards the frequency of the springing movements, and the gas pressure present in each case. The exact nature of this invention as well as other objects and advantages thereof will be readily apparent from consideration of the following specification relating to the annexed drawing in which:

Fig. 1 is a sectional elevational view of a preferred embodiment of the invention; and Fig. 2 illustrates a modified detail of the device of Fig. 1 in sectional elevational view. In Fig. 1 of the accompanying drawing 1 designates a compressed air container which is connected with a control valve 3 by means of a feed conduit 2. The control valve 3 possesses a housing 4 with an admission chamber 5 and a discharge chamber 6, into which antechambers 5' and 6' are divided by valve seatings 7 and valve heads 8 and 9. The feed conduit 2 opens into the antechamber 5', while the antechamber 6' is connected by a channel 10 with the admission chamber 5. The channel 10 communicates through a channel 11 and through a conduit 12 with the internal space of a gas-spring body 13, which is arranged in known manner between superstructure and wheel-guiding elements. Finally the discharge chamber 6 opens into atmosphere. The valve heads 8 and 9 are secured at the ends of stems 14, which extend into spring chambers 15 and are subject to the effect of closing springs 16. These press against spring plates 17 which are provided at the other ends of the stems 14, in order to press the valve heads 8 and 9 upon their seatings. The spring chambers 15 are closed by cup-shaped spring caps 18 which are fitted over the ends of the stems 14 carrying the spring plates 17. The spring caps 18 are guided for sliding into the spring chambers 15 but are held pressed in the opposite direction against stops by springs 19 which are inserted in each case between the end of the spring cap 18 and the spring plate 17. At an adjustable distance above the spring caps 18 there are push rods 20 and 21 which are secured to a lever 22. The lever 22, connected with the wheel-guiding elements by means of a connecting rod 27, is hingedly mounted between the push rods 20 and 21 at 23 to the head of a plunger piston 25 guided in sealing and slidable fashion in a cylinder 24 closed at one end. Between the head of the cylinder 24 and the plunger piston 25, there is inserted a traction spring 26 or a blocking device which is correspondingly stable in its effect, which seeks to pull the plunger piston 25 into the cylinder 24. The conduit 26' connects the interior of the cylinder 24 with the feed conduit 2. The cylinder 24 is preferably firmly connected with the housing 4 of the control valve 3. On a relative movement between the superstructure of the vehicle—to which the control valve is secured—and the wheel-guiding elements, the lever 22 is hinged about the hinge point at 23, namely in the counter clockwise direction in the case of reductions of the distance between superstructure and wheel, and in the clockwise direction in the case of increase of this distance. Here in the former case the pushrod 21, and in the latter case the push rod 20, will rest upon the end of the corresponding valve cap 18 after overcoming the clearance designated by capital S, and will push this cap then into the spring chamber 15. This movement of the valve cap is then transmitted by the spring 19 to the valve head 17, whereupon the valve 8 or 9 is opened, so that this valve connects the reservoir 1 with the gas-spring body 13 or with atmosphere. Thus a corresponding correction of the quantity of air enclosed in the gas-spring body 13 in the direction of an increase or decrease is effected.

Now it is clear that in the movement of the valve cap 18, firstly the spring 19, the characteristic of which is carefully adapted to that of the closing spring 16, must be compressed before the opening of the corresponding valve can take place, that is to say the valves respond with a delay adjustable by the adaptation of the spring 19. Similarly a delay can occur between the resting of the valves on their seatings and the valve caps on their stops. Thus the arrangement as described is a structure capable of oscillation, with its own oscillation frequency figure. Now if the frequency of the relative movements between superstructure and wheel exceeds this inherent oscillation frequency, for example when travelling over bumpy paving, the valves are no longer opened at all and a correction of the quantity of air enclosed in the gas-spring body, unnecessary in itself, no longer takes place. By a variation of the properties of the spring 19 the sensitivity of the control valve as regards the frequencies of the wheel movements can be influenced.

It should be mentioned in this connection that in place of a mechanical spring 19, a resilient medium, for example compressed air, can be used as shown in Fig. 2. The spring plate 17' is sealed off in the valve cap 18' and the valve cap 18' is filled with compressed air which presses the valve cap 18' onto its stop and would behave in other respects also like the spring 19. The air pressure obtaining in the valve cap 18' can be determined by hand or preferably in dependence upon the reservoir pressure. A conduit 28 connects the body of compressed air within the valve cap 18' with the compressed air container. The latter arrangement has the advantage that as the storage pressure drops the above-mentioned inherent oscillation frequency and thus the range of frequencies to which the control valve still responds, namely the range below the inherent oscillation frequency, is reduced. This signifies a more economical regulation of the use of the air supply which has already been called upon. Naturally it would be possible also to select other factors which determine the regulation of the frequency sensitivity of the control valve.

The securing of the lever 22 on the piston 25 serves for similar purposes. Let it be assumed that when the piston 25 is in the position as illustrated and when a constant pressure head has been set in the reservoir 1, equilibrium obtains between the storage pressure acting upon the piston 25 and the spring 26. The clearance S here amounts to a predetermined normal value. Now if the container pressure drops, the force of the spring 26 gains the upper hand and draws the piston 25 into the cylinder 24 until a fresh state of equilibrium has been reached, the clearance S increasing. This signifies that the control valve 3 will only respond to greater movements of the wheel than hitherto, which admittedly is equivalent to a reduction in the use of air. The sensitivity of the control valve 3 to the magnitude of the wheel movements could also be influenced by hand or could be made dependent upon other factors than the container pressure.

What I claim is:

In a fluid spring arrangement for connecting the sprung and unsprung masses of a vehicle, in combination, resilient container means interposed between said sprung and said unsprung masses; a body of resilient fluid in said container means; a source of said fluid under pressure; a first valve communicating with said container means and said source for selectively admitting fluid from said source to said container means; a second valve communicating with said container means and the atmosphere for selectively releasing said fluid from said container means, said valves being mounted on one of said masses; a resilient actuator member on each of said valves; cylinder means on said one mass communicating with said source of fluid; piston means reciprocable in said cylinder means responsive to the variation in the fluid pressure of said source; a lever pivotally mounted on said piston means and connected to the other one of said masses for pivoting movement of said lever during relative movement of said masses; and two engaging elements on said lever for alternating actuating engagement with said resilient actuator members during said pivoting movement of said lever, said engaging elements being moved toward and away from said resilient actuator members by the reciprocating movement of said piston means.

References Cited in the file of this patent

UNITED STATES PATENTS

| | | |
|---|---|---|
| 1,551,651 | Everhart | Sept. 1, 1925 |
| 1,585,833 | Down | May 25, 1926 |
| 2,643,676 | Curran | June 30, 1953 |
| 2,670,201 | Rossman | Feb. 23, 1954 |

FOREIGN PATENTS

| | | |
|---|---|---|
| 1,149,936 | France | July 29, 1957 |